United States Patent
Kwon et al.

(10) Patent No.: US 6,594,426 B1
(45) Date of Patent: Jul. 15, 2003

(54) APPARATUS AND METHOD FOR CONTROLLING THE POSITIONING OF OPTICAL FIBER BLOCKS AND A PLANAR LIGHTWAVE CIRCUIT

(75) Inventors: Oh-Dal Kwon, Seoul (KR); Jin-Soo Kim, Suwon (KR); Hyun-Seob Park, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/379,747

(22) Filed: Aug. 24, 1999

(30) Foreign Application Priority Data

Aug. 24, 1998 (KR) .............................. 98-34274

(51) Int. Cl.[7] .............................................. G02B 6/26
(52) U.S. Cl. ............................................. 385/52
(58) Field of Search ............................ 385/52, 88, 92, 385/27, 56, 135, 136, 139, 140, 43, 49, 14

(56) References Cited

U.S. PATENT DOCUMENTS 5,359,683 A * 10/1994 Pan .............................. 385/22

6,217,231 B1 * 4/2001 Mesaki et al. ................ 385/14
6,240,235 B1 * 5/2001 Uno et al. .................... 385/137

FOREIGN PATENT DOCUMENTS

JP          08054536        2/1996        ............ G02B/6/30

* cited by examiner

*Primary Examiner*—Tu T. Nguyen
(74) *Attorney, Agent, or Firm*—Sughrue Mion, PLLC

(57) ABSTRACT

An apparatus and its method for controlling the positioning of optical fiber blocks and a Planar Lightwave Circuit, wherein alignment marks are formed for input and output optical fiber blocks and a Planar Lightwave Circuit, and position images of the alignment marks are detected by means of a microcomputer, CCD cameras and micro positioners, which allow quick operation of the initial positions which are capable of positioning, to acquire output optical signals passing by noise areas. Accordingly, the overall productivity is increased. Further, there are not a lot differences in speed between skilled hands and novices since the positioning operations do not rely on the expertise of the operator, and the positioning operations for mass production can be accomplished since the speed of repetition is enhanced.

17 Claims, 6 Drawing Sheets

APPARATUS AND METHOD FOR CONTROLLING THE POSITIONING OF OPTICAL FIBER BLOCKS AND A PLANAR LIGHTWAVE CIRCUIT

The present invention relates to an apparatus and method for controlling the positioning of optical fiber blocks and a Planar Lightwave Circuit, having an arrangement between an input and output optical fiber block for accommodating an optical fiber, and a Planar Lightwave Circuit, respectively.

BACKGROUND OF THE INVENTION

In an optical fiber communication system which uses light, an optical fiber comprises a very fine strand or a cable of bundled-strands which are made of transparent resins such as glass, synthetic resins and the like. The optical fiber is used to transmit information signals and optical images etc. The thickness of the strand is about 3–60 $\mu$m in glass. The optical fiber is of a step index type and a graded index type, etc.

The structure of the step index type includes the following: a core of a high refractive index, a clad of a low refractive index for molding the core, and a jacket for optical absorption which accommodates the core and the clad.

The graded index type has a lower refractive index from its center to its outer circular periphery. The light, in each mode for relating to the length of a fiber or a refractive index distribution, is transmitted by means of meandering or total reflecting in the core with a low-loss. A single mode fiber is one in which a fiber transmits only the lowest mode by way of making the core of the step index type small, and one in which has no mode dispersions and has wide transmission bands.

To branch a path of the above-mentioned optical fiber into plural paths, various devices, apparatuses and methods exist. Particularly, a positioning apparatus and its corresponding method which uses the Planar Lightwave Circuit are widely used. The Planar Lightwave Circuit comprises one or more input parts and a plurality of output parts, cores for forming light-waveguides and a clad for molding the cores. Accordingly, by fixing each core at the input parts and the output parts of the Planar Lightwave Circuit, one or more light-waveguides are branched into plural paths.

FIG. 1 is a schematic diagram of a conventional apparatus for positioning optical fiber 10 blocks and a Planar Lightwave Circuit, and FIGS. 2A and 2B are flowcharts according to FIG. 1.

As shown in FIG. 1, the reference numeral 10 is a laser source, the reference numeral 20 is an optical fiber, and the reference numeral 30 is an input optical fiber block. The optical fiber 20 comprises commonly a core (not shown) and a clad (not shown). One side of the optical fiber 20 is connected to the laser source 10, and another side is accommodated in the input optical fiber block 30. The laser source 10 generates light signals in order to generate an incident signal inside the optical fiber 20 that is the core and the clad. Accordingly, the optical fiber 20 makes the incident optical signals direct into the input optical fiber block 30.

The reference numeral 40 is a Planar Lightwave Circuit, the reference numeral 50 is a lens, the reference numeral 51 is an infrared camera, and the reference numeral 52 is a charge coupled device (CCD) camera. The Planar Lightwave Circuit 40 comprises one or more input parts 41a and plural output parts 41b at both of its ends so as to form waveguides for branching one or more inputs of optical signals into plural paths. One side of the Planar Lightwave Circuit 40 is positioned with the input optical fiber block 30. Here, the optical fiber 20 accommodated in the input optical fiber block 30, and the input parts of the cores of the Planar Lightwave Circuit 40, are positioned in accord with each other.

The CCD camera 52 receives image signals regarding to positioning the Planar Lightwave Circuit 40 and the input optical fiber block 30. The lens 50 and the infrared camera 51 detect optical output signals introduced from the output parts 41b of the core of the Planar Lightwave Circuit 40, and then check exactly the Planar Lightwave Circuit 40 and the input optical fiber block 30.

The reference numeral 60 is an output optical fiber block, and the reference numeral 70 is a powermeter. The output optical fiber block 60 accommodates plural optical fibers 21 which are corresponded with output parts 41b of the core in the Planar Lightwave Circuit 40. The powermeter 70 calculates the optical output signals introduced from the cores of the optical fibers 21 of the optical fiber block 60, and then checks the final status of the input optical fiber block 30, the Planar Lightwave Circuit 40 and the output optical fiber block 60.

The reference numerals 81 and 82 are micro-positioners, and reference numeral 83 is an upholder. The upholder 83 fixes the Planar Lightwave Circuit 40. The micro-positioners 81 and 82 fix the input and the output optical fiber blocks 30 and 60, respectively, and drive their locations at 6-axes directions, and position both sides of the Planar Lightwave Circuit 40 and each location and angle of the input and the output optical fiber blocks 30 and 60, respectively. The 6-axes, with reference to FIG. 1, are x, y and z axes at a side which is corresponded with each optical fiber block 30 and 60 and the Planar Lightwave Circuit 40, and $\theta x$, $\theta y$ and $\theta z$ axes which are each angle of the x, y and z axes.

The reference numeral 80 is a microcomputer. The microcomputer 80 receives input signals introduced from the CCD camera 52, the infrared camera 51 and the power meter 70, and then controls each driving status of the micro-positioners 81 and 82.

With reference to FIGS. 2A and 2B, the operations of the above-described conventional structure will be explained as follows.

When one part of the core of the optical fiber 20 is connected to the laser source 10, and when another part of the core is accommodated in the input optical fiber block 30, they are both positioned in the input optical fiber block 30 and the Planar Lightwave Circuit 40 (S101). In this case, it is preferable that the optical fiber 20 accommodated in the input optical fiber block 30 and the input part 41a of the core 40 in the Planar Lightwave Circuit 40 must be positioned to accord with each other in a straight line. Substantially, since the core of the optical fiber 20 is very small, it is difficult for the optical fiber 20 and the input part 41a of the core 40 to be accorded with each other.

In such a status, an operator detects each positioned image of the input optical fiber block 30 and the Planar Lightwave Circuit 40 by using the microcomputer 80 and the CCD camera 52 (S102), and then decides whether the positions of the images are good. If the position of each image is not satisfactory (S103), the operator controls the initial position of the input fiber block 30 to another position for acquiring the determined optical output signal by means of the micro-positioner 81 (S104). The initial position of the input fiber block 30 represents a position for acquiring a determined optical output signal passing by the noise areas. It is accomplished generally by a blind-search such as an eye measurement by the operator, and by intuition according to his experiments, and the like. Accordingly, a great deal of time is wasted at the controlling step of this initial position of the total steps, and more time is wasted if the operator is a novice.

Next, the operator positions the lens 50 and the infrared camera 51 to the output part 41b of the core 41 of the Planar Lightwave Circuit 40 (S105), and detects an optical signal which is introduced from the Planar Lightwave Circuit 40, by means of the infrared camera 51 (S106). If the optical signal is not satisfied (S107), the operator detects exactly each position of the input optical fiber block 30 and the Planar Lightwave Circuit 40 (S108).

To explain the above-steps in detail, an explanation will follow. In a status that the input optical fiber block 30, the Planar Lightwave Circuit 40, the lens 50 and the infrared camera 51 are accorded almost in a straight line, the laser source 10 generates a light signal, and the light signal inside of the optical fiber 20 directs to the input optical fiber block 30. And then the light signal incident on the input part 41a of the core 41 in the Planar Lightwave Circuit 40 branches into plural paths through the core 41 so as to be introduced to a plurality of output parts 41b. The infrared camera 51 detects an optical signal introduced from the output parts 41b of the core 41 of the Planar Lightwave Circuit 40. The operator determines the positioning status between the input optical fiber block 30 and the Planar Lightwave Circuit 40 exactly by the signal until the signal has a good status continuously, S108.

Here, in supporting the input optical fiber block 30, the micro-positioner 81 drives the input optical fiber block 30 to 6-axes directions so as to position locations and angles of the corresponding side to the Planar Lightwave Circuit 40.

Next, in the state in which the input optical fiber block 30 and the Planar Lightwave Circuit 40 are positioned with each other, the operator moves a micro-positioner of output part 82 to the x-axis direction to position the Planar Lightwave Circuit 40 and the output optical fiber block 60 (S109). In this case, it is preferable that the core 41 accommodated in the output optical fiber block 60 and the output part 41b of the core 41 in the Planar Lightwave Circuit 40 are accorded in a straight line, respectively.

In such a status, the operator detects each positioned image of the output optical fiber block 60 and Planar Lightwave Circuit 40 by using the microcomputer 80 and the CCD camera 52 (S110), and decides whether the positioned images are good (S111). If each positioned image is not good, the operator controls an initial position of the output optical fiber block 60 to a position for acquiring a determined optical signal (S112). This series of operations is different only in detecting objects and their locations, in comparison with the controlling steps (S102–S104) of the initial position of the input optical fiber block 30, but their basic operations are the same. Accordingly, their detailed explanations are omitted.

The operator detects optical signals introduced from the core 41 to the input optical fiber block 60 by using a powermeter 70, S113, and decides whether the optical signals are good. If the optical signals are not good, S114, the operator detects exactly the final positioning status of the input optical fiber block 30, the Planar Lightwave Circuit 40 and the output optical fiber block 60, S115.

To explain the above-steps S113–S115, a detailed explanation follows.

In a status that the input optical fiber block 30, the Planar Lightwave Circuit 40 and the output optical fiber block 60 are positioned to acquire the initial output, the incident light into the input part 41a of the core 41 in the Planar Lightwave Circuit 40 through the input optical fiber block 30, is introduced into the plurality of the output part 41b of the core 41 in the Planar Lightwave Circuit 40, and is incident into the plural optical fiber 21 of the output optical fiber block 60.

This optical signal is directed into the inside of the optical fiber 21, and then it is directed to the powermeter 70 located at their back sides. The powermeter 70 calculates each intensity of the output optical signal introduced from the plural optical fiber 21, and applies the microcomputer 80. The microcomputer 80 then compares the output optical signals of the output optical fiber block 60 with the determined reference levels inputted in advance, and then detects the final status of the input optical fiber block 30, the Planar Lightwave Circuit 40 and the output optical fiber block 60, respectively.

If the optical signals detected by the powermeter 70 are not good, i.e., if the optical signals are under the predetermined reference levels, the positions of the Planar Lightwave Circuit 40 and the output optical fiber block 60 are controlled continuously until good optical signals are detected. Here, the micro positioner 82 drives the output optical fiber block 60 is 6-axes directions so as to position locations and angles of the corresponding side to the Planar Lightwave Circuit 40.

Next, if the optical signals detected by the powermeter 70 are good, the input optical fiber block 30, the Planar Lightwave Circuit 40 and the output optical fiber block 60 are adhered to each other by using adhesives. Accordingly, all positioning operations are finished (S116).

In such a conventional apparatus and its method for positioning optical fiber blocks and the Planar Lightwave Circuit, for the initial positions of the input and the output fiber blocks 30 and 60, that is, positions for acquiring the determined optical output signal passing by the noise areas, it is accomplished generally by a blind-search such as an eye measurement by the operator and by intuition according to his experiments, and the like. Accordingly, a great deal of time is wasted at the controlling steps of this initial position of the total steps, and more time is wasted if the operator is a novice.

Besides, since these positioning operations rely heavily on the expertise of the operator, and since it is difficult to acquire skilled technical employees, the positioning operations for mass production cannot be accomplished. Furthermore, since there are a lot differences, particularly in speed, between skilled hands and novices, there is a problem that overall productivity is lowered.

SUMMARY OF THE INVENTION

The present invention has been designed to overcome the above problems, and accordingly, it is a first object of the present invention to provide an apparatus and method for controlling the positioning of the optical fiber blocks and a Planar Lightwave Circuit, which positions quickly and correctly the optical fiber blocks and the Planar Lightwave Circuit with alignment marks, respectively.

A second object of the present invention is to provide an apparatus and method for controlling the positioning of the optical fiber blocks and a Planar Lightwave Circuit, which increases their quickness and repetition by controlling effectively the optical fiber blocks and the Planar Lightwave Circuit with alignment marks, respectively.

To achieve the above objects, the present invention provides an apparatus for positioning optical fiber blocks and a Planar Lightwave Circuit comprising: a micro-positioning means for fixing an input optical fiber block and an output optical fiber block with alignment marks, respectively, and for positioning the optical fiber blocks and a Planar Lightwave Circuit with alignment marks by means of controlling their positions; a position detecting means for detecting each position of the alignment marks of the input optical fiber block, the Planar Lightwave Circuit and the output optical fiber block: and a control means for judging each status of the alignment marks detected by the micro-positioning means, and then for controlling each operating status of the micro-positioning means.

Additionally, the apparatus comprises means for adhering, to contact the input optical fiber block, the Planar Lightwave Circuit and the output optical fiber block, respectively.

The position detecting means comprises: an upper camera for detecting the image of each alignment mark of the input optical fiber block, the Planar Lightwave Circuit and the output optical fiber block at the upper direction; and a side camera for detecting the image of each alignment mark of the input optical fiber block, the Planar Lightwave Circuit and the output optical fiber block at the side direction. It is preferable that the upper or side camera is a charge coupled device camera for converting detected light signals into electrical signals.

Preferably, the control means is capable of monitoring the image of each alignment mark detected by the position detecting means.

One, or both sides of the Planar Lightwave Circuit (PLC), and of the input and output optical fiber blocks are formed to give a slope.

The alignment marks are formed to have shapes in fabricating the PLCs, and the shapes are F-shaped marks. The alignment marks are for positioning the cores at the upper or the side parts of the Planar Lightwave Circuit.

To achieve the above objects, the present invention provides an optical fiber block with alignment marks comprising: a substrate having plural grooves formed on its upper part; optical fibers which are fixed in the grooves, and for directing optical signals; alignment marks formed on the upper part of the substrate, and for becoming a basis for positioning of the optical fibers; and an optical glass for covering disclosed upper sides of the substrate and the optical fibers.

The substrate additionally has adhesion stop grooves formed at both right and left sides of the plural grooves, which are V-shaped. The alignment marks are formed to have shapes in fabricating the PLCs, and the shapes are F-shaped marks. The alignment marks are to position the optical fibers at the upper or the side parts of an optical fiber block. The optical glass is made of a transparent material.

To achieve the above objects, the present invention provides a Planar Lightwave Circuit with alignment marks comprising: cores for branching one or more inputs into plural outputs, and for forming each waveguide; a clad for molding the cores; and alignment marks formed in the upper corners of the clad, and for becoming a basis for the positioning of a Planar Lightwave Circuit. The alignment marks are formed to have their shapes by the fabricating of the PLCs. The determined shapes are F-shaped marks. The alignment marks are for positioning the cores at the upper or the side parts of the Planar Lightwave Circuit To achieve the above objects, the present invention provides an apparatus for positioning optical fiber blocks and a Planar Lightwave Circuit comprising: a micro-positioning means for fixing an input optical fiber block and an output optical fiber block with alignment marks, respectively, and for positioning the optical fiber blocks and a Planar Lightwave Circuit with alignment marks by means of controlling their positions; a position detecting means for detecting each position of the alignment marks of the input optical fiber block, the Planar Lightwave Circuit and the output optical fiber block; and a control means for judging each status of the alignment marks detected by the micro-positioning means, and then for controlling each operating status of the micro-positioning means.

The apparatus comprises additionally, means for adhering, to contact the input optical fiber block, the Planar Lightwave Circuit and the output optical fiber block, respectively.

The position detecting means comprises: an upper camera for detecting an image of each alignment mark of the input optical fiber block, the Planar Lightwave Circuit and the output optical fiber block at the upper direction; and a side camera for detecting the image of each alignment mark of the input optical fiber block, the Planar Lightwave Circuit and the output optical fiber block at the side direction. The upper or side camera is a charge coupled device camera for converting detected light signals into electrical signals. The control means is capable of monitoring the image of each alignment mark detected by the position detecting means. Both sides of the Planar Lightwave Circuit are formed to give a slope. One side of each optical fiber block is formed to give a slope. The alignment marks are formed to have shapes by fabricating the PLCs. The determined shapes are F-shaped marks. The alignment marks are for positioning the cores at the upper or the side parts of the Planar Lightwave Circuit.

To achieve the above objects, the present invention provides an apparatus for positioning optical fiber blocks and a Planar Lightwave Circuit comprising: a laser source for introducing optical signals into an input optical fiber block; micro-positioners for fixing input and output optical fiber blocks with alignment marks, respectively, and for positioning the optical fiber blocks and a Planar Lightwave Circuit with alignment marks by means of controlling their positions; position detectors for detecting each position of the alignment marks of the input optical fiber block, the Planar Lightwave Circuit and the output optical fiber block, respectively; a power meter for detecting optical output signals of the output optical fiber block; a controller for judging each status of the alignment marks detected by the micro-positioners, and then for controlling each operating status of the micro positioners; and an adhering part for contacting the input optical fiber block, the Planar Lightwave Circuit and the output optical fiber block, respectively.

The position detectors comprise: an upper camera for detecting the image of each alignment mark of the input optical fiber block, the Planar Lightwave Circuit and the output optical fiber block at the upper direction; and a side camera for detecting the image of each alignment mark of the input optical fiber block, the Planar Lightwave Circuit and the output optical fiber block at the side direction.

To achieve the above objects, the present invention provides a method for manufacturing an optical fiber block with alignment marks comprising: a first step of forming plural grooves on a substrate; a second step of forming alignment marks becoming a basis for positioning on the substrate; a third step of fixing optical fibers for directing optical signals in the grooves; and a fourth step of forming an optical glass on the substrate and the optical fiber disclosed.

The first step forms adhesion stop grooves at both ends on the substrate, and forms also plural V-shaped grooves between the adhesion stop grooves. The alignment marks in the second step are formed by fabrication to be F-shaped marks.

To achieve the above objects, in a method for manufacturing a Planar Lightwave Circuit with a core and a clad, a method for manufacturing a Planar Lightwave Circuit with alignment marks is characterized in forming alignment marks becoming a basis for positioning at the insides of the corners on the clad.

To achieve the above objects, the present invention provides a method for controlling an apparatus for positioning optical fiber blocks and a Planar Lightwave Circuit comprising: a first step for positioning an input optical fiber block, a Planar Lightwave Circuit and an output optical fiber block, respectively; a second step for controlling an initial position of the input optical fiber block, if the detected positions of each alignment mark of the input optical fiber block is not good; a third step for controlling an initial position of the output optical fiber block, if the detected positions of each alignment mark of the output optical fiber block is not good; a fourth step for controlling the exact positions of the optical fiber blocks according to the outcome when output optical signals detected from the output optical fiber block are compared with predetermined reference levels; and a fifth step for adhering the input optical fiber block, the Planar Lightwave Circuit and the output optical fiber block, respectively.

Accordingly, the apparatus and its controlling method for positioning optical fiber blocks and a Planar Lightwave Circuit according to the present invention can detect each of the alignment marks of the input optical fiber block, the Planar Lightwave Circuit and the output optical fiber blocks when optical fibers are branching, and then can position to quickly contact the initial positions of the input and output optical fiber blocks; that is, positions for acquiring determined optical output signals passing by the noise areas.

BRIEF DESCRIPTION OF THE DRAWINGS

The above objects and advantages will be more apparent by describing the present invention with reference to the accompanied reference drawings, in which.

DETAILED DESCRIPTION OF THE PREFERRED EMBODIMENTS

The present invention will become more apparent by describing in detail in a preferred embodiment thereof with reference to the attached drawings.

Figure 1:
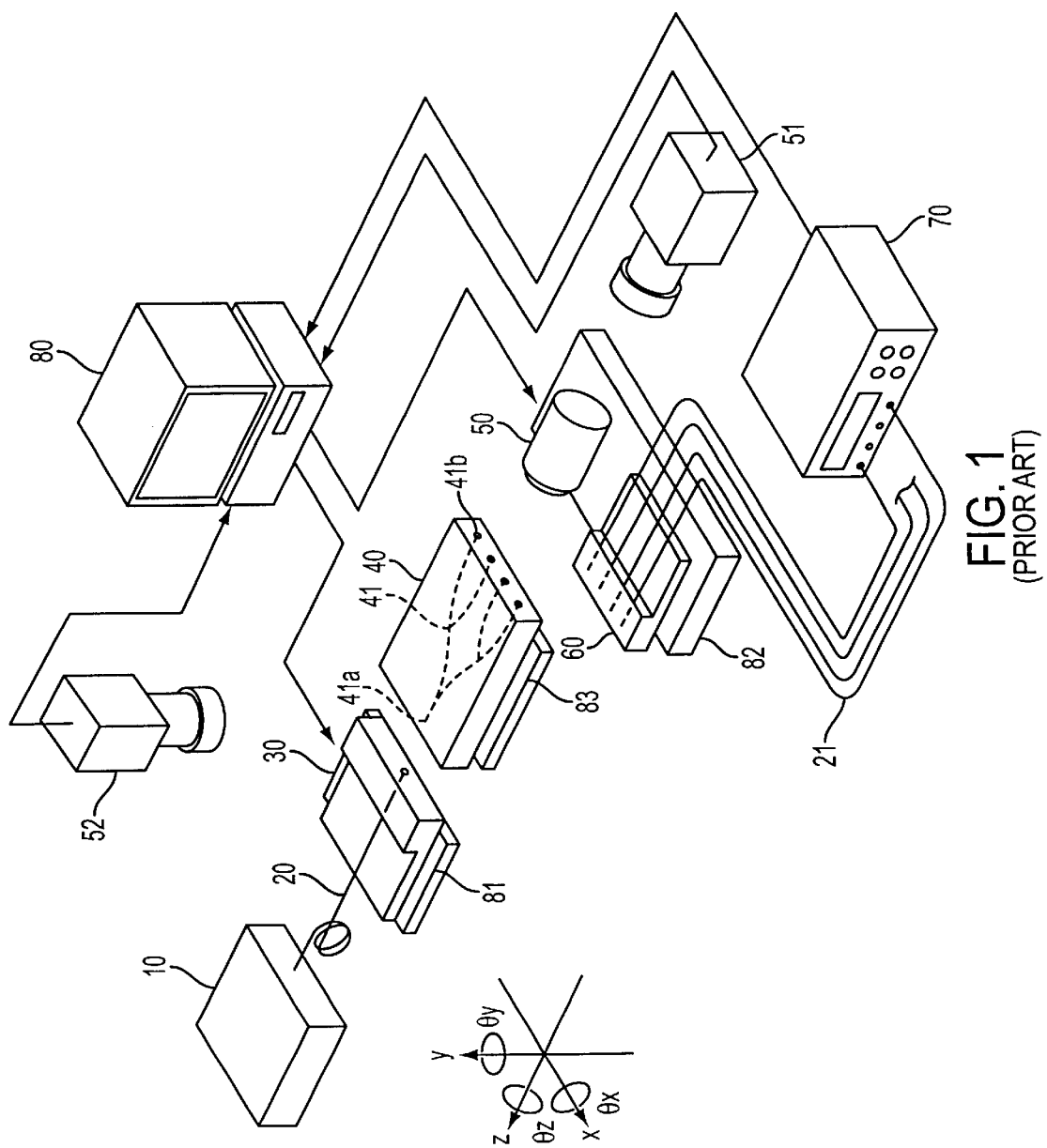
FIG. 1 is a schematic diagram of a conventional apparatus for positioning optical fiber blocks and a Planar Lightwave Circuit.
Figure 2A:
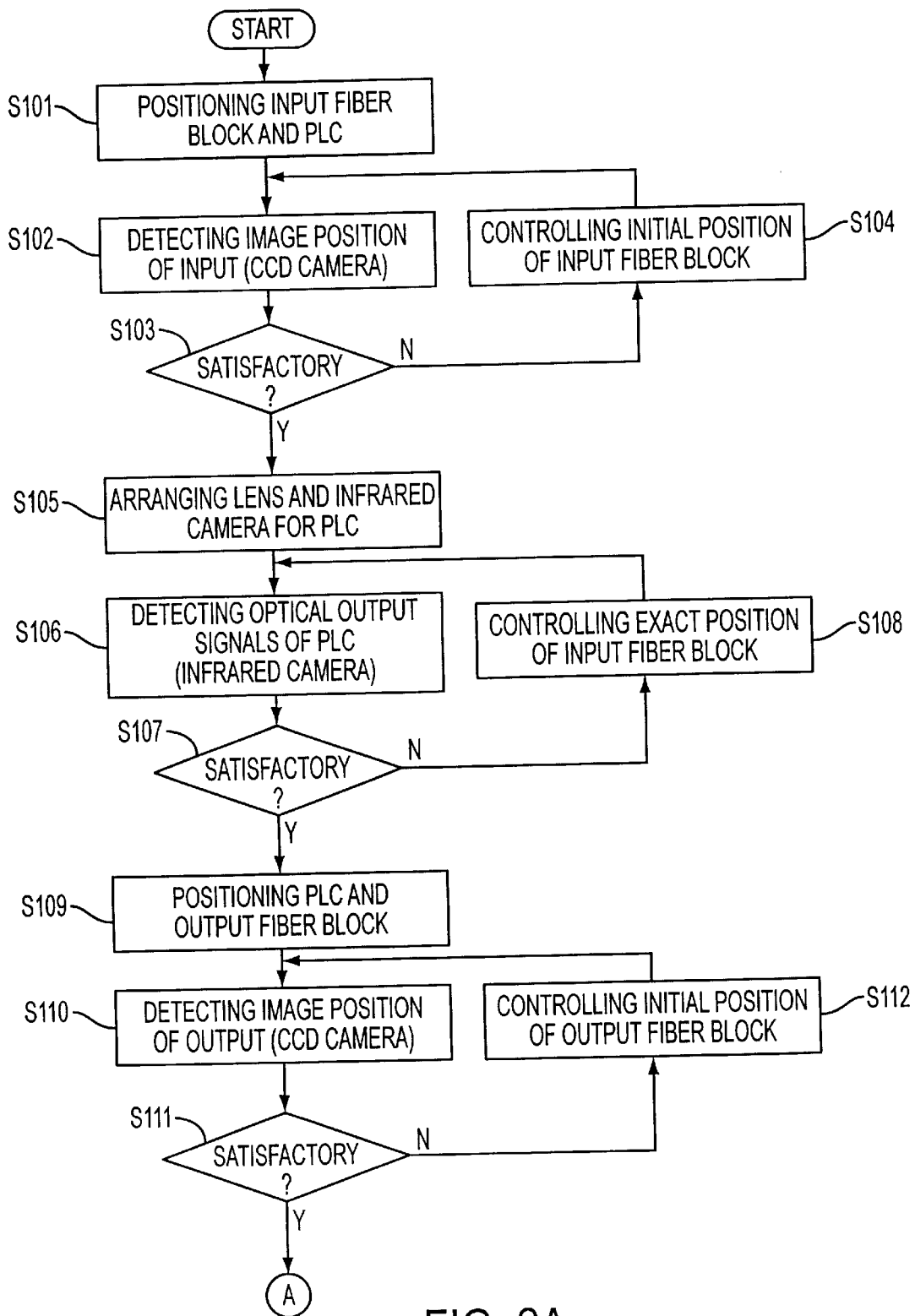
FIGS. 2A and 2B are flowcharts of a conventional method for positioning optical fiber blocks and a Planar Lightwave Circuit.
Figure 2B:
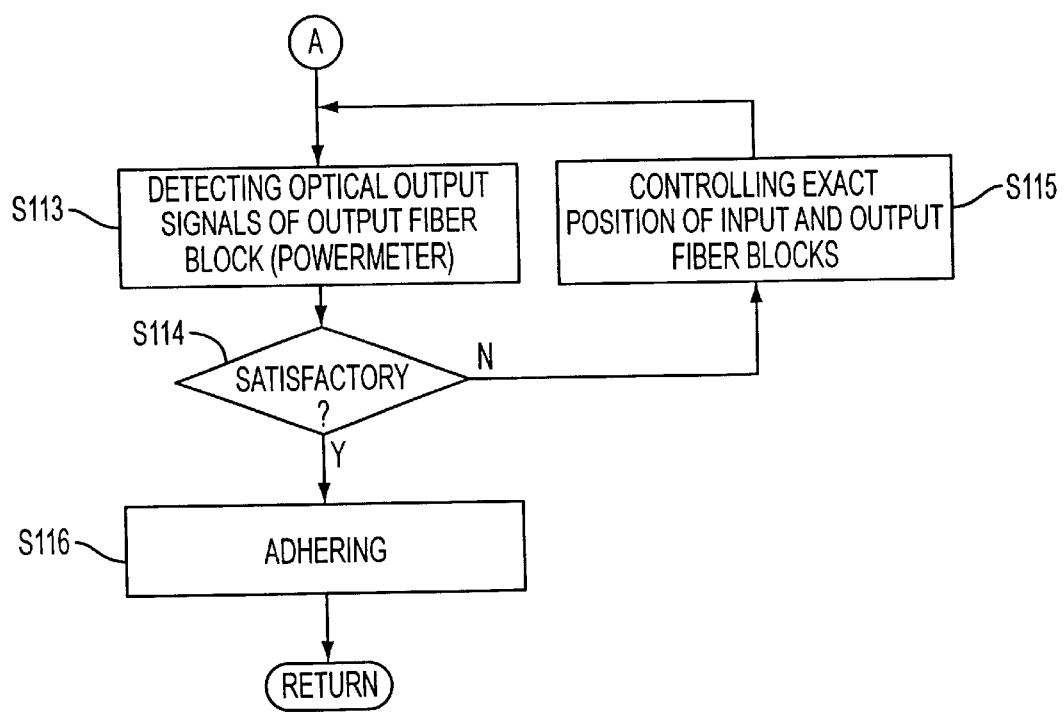
Figure 3:
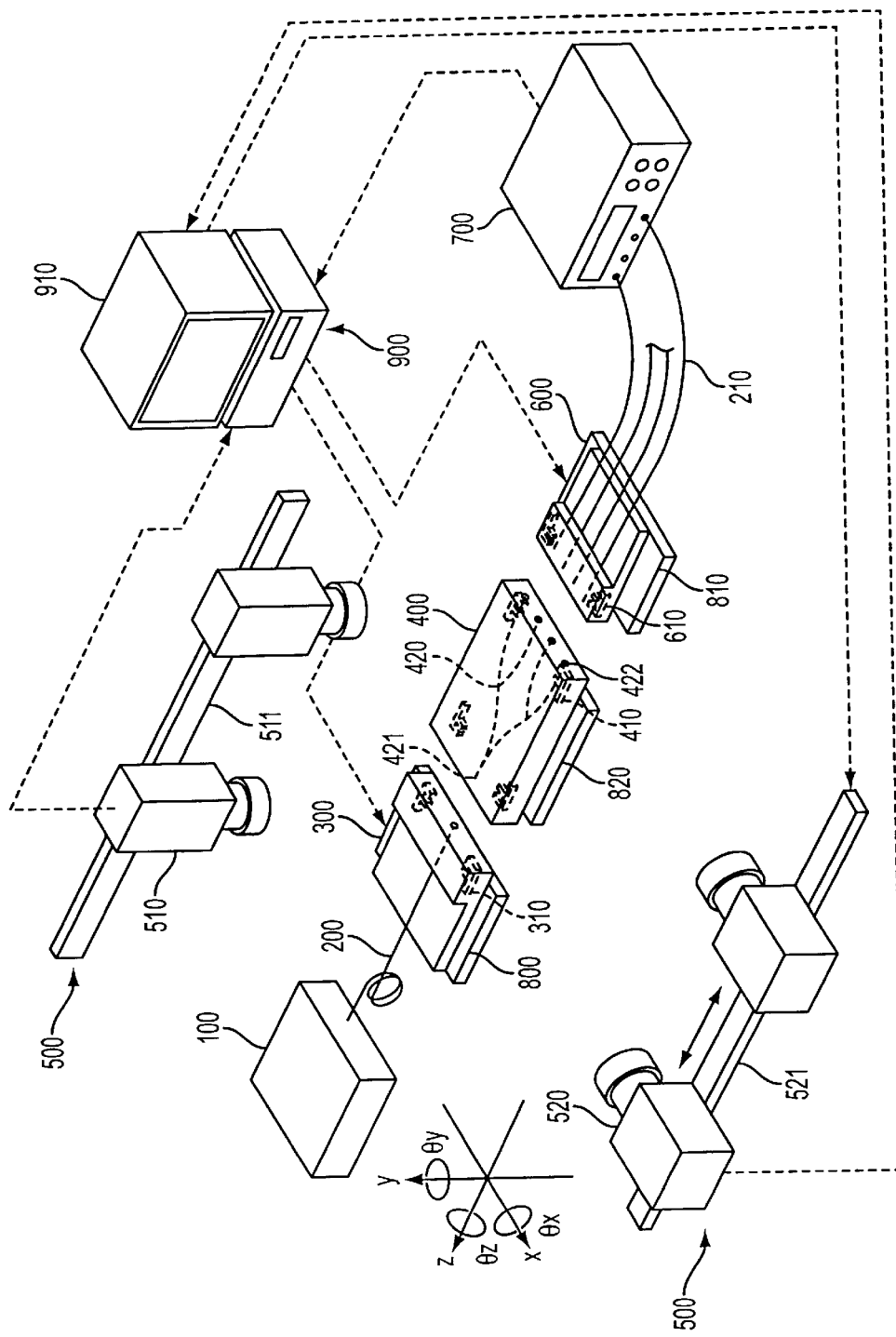
FIG. 3 is a schematic diagram of the apparatus for positioning optical fiber blocks and a Planar Lightwave Circuit according to the present invention.

FIG. 3 is a schematic diagram of the apparatus for positioning optical fiber blocks and a Planar Lightwave Circuit according to the present invention.

The reference numeral 100 is a laser source, the reference numeral 200 is an optical fiber, and the reference numeral 300 is an input optical fiber block.

One side of the optical fiber 200 is connected to the laser source 100, and another side is accommodated in the input optical fiber block 300. The laser source 100 generates light signals in order for an incident inside the optical fiber 200. The optical fiber 200 directs the incident optical signals into the input optical fiber block 300.

The reference numeral 400 is a Planar Lightwave Circuit, and the reference numeral 600 is an output optical fiber block, and the reference numeral 700 is a powermeter. One side is an output optical fiber block, and the reference numeral 700 is a powermeter. One side of the Planar Lightwave Circuit 400 is positioned with the input optical fiber block 300, and another side is positioned with the output optical fiber block 600. Here, by corresponding to the locations of each alignment mark, there are positioned to accord with each of the optical fibers 200 and 210 accommodated in the input and output optical fiber blocks 300 and 600 and the input parts 421 and the output parts 422 of the cores of the Planar Lightwave Circuit 400. Besides, the output optical fiber block 600 accommodates plural optical fibers 210 to position/contact which are corresponded with the cores 420 of the plural output parts 422 in the Planar Lightwave Circuit 400. The powermeter 700 calculates optical output signals introduced from the output optical fiber block 600.

The reference numeral 820 is an upholder, and the reference numerals 800, 810 are micro-positioners of the input and output, respectively. The upholder 820 fixes the Planar Lightwave Circuit 400. The micro-positioners 800 and 810 fix the input and the output optical fiber blocks 300 and 600, respectively, and drive their locations at 6-axes directions, and position the front and back sides of the Planar Lightwave Circuit 400 and each location and angle of the input and the output optical fiber blocks 300 and 600, respectively.

The reference numeral 500 is a position detector. The position detector 500 detects positions of each alignment marks 310, 410, and 610 of the input optical fiber block 300, the Planar Lightwave Circuit 400 and the output optical fiber block 600. It is preferable that the alignment marks 310, 410, and 610 are F-shaped marks.

Also, it is preferable that the position detector 500 comprises an upper camera 510 which is capable of detecting position images of each of the alignment marks 310, 410, and 610 of the input optical fiber block 300, the Planar Lightwave Circuit 400 and the output optical fiber block 600 at the upper part, and a side camera 520 which is capable of detecting position images of each of the alignment marks 310, 410, and 610 of the input optical fiber block 300, the Planar Lightwave Circuit 400 and the output optical fiber block 600 at the side part. The upper camera 510 and the side camera 520 generally use CCD cameras, and each transmitting part 511 and 521 is disposed to transmit the upper and the side cameras 510 and 520 to their determined positions.

The reference numeral 900 is a microcomputer, and the reference numeral 910 is a monitor. The microcomputer 900 decides whether each of the alignment marks 310, 410, and 610 detected by the position detector 500 is located in a good position compared with each other, and then controls each driving status of the micro-positioners 800 and 810. The monitor 910 is capable of monitoring images according to positions which are introduced from the upper and the side cameras 510 and 520.

Figure 4A:
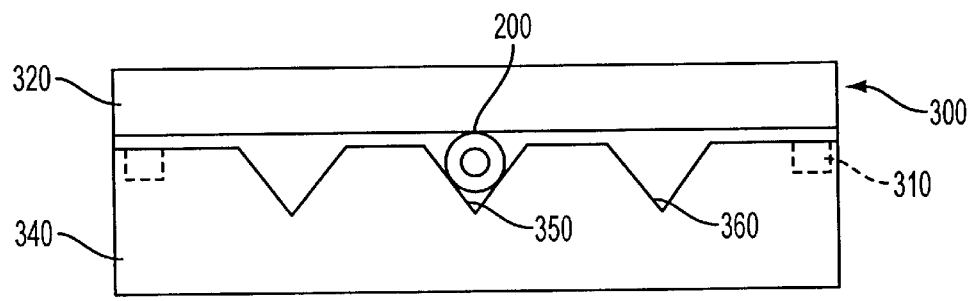
FIGS. 4A and 4B are vertical cutaway views of the input optical fiber block and the output optical fiber block with alignment marks, respectively, according to the present invention.
Figure 4B:
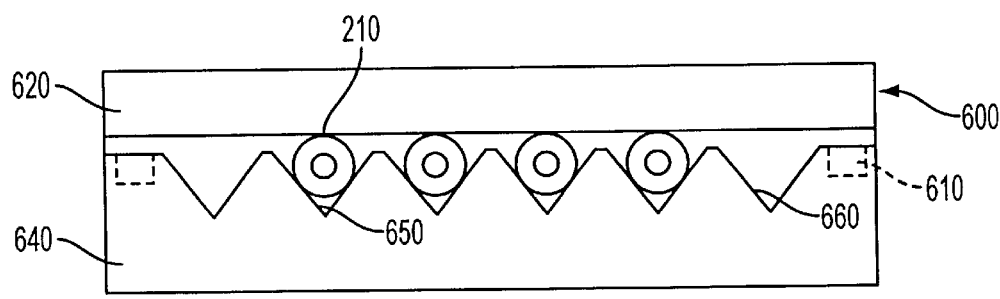

FIGS. 4A and 4B are vertical cutaway views of an input optical fiber block and an output optical fiber block with alignment marks, respectively, according to the present invention.

The basic structures between the input optical fiber block 300 and the output optical fiber block 600 are the same, but numbers of the optical fiber 200 and 210 accommodated on substrates 340 and 640, respectively, are only different from each other. That is, the reference numerals 200 and 210 are optical fibers which comprise a core and a clad inside of them, and the reference numerals 340 and 640 are substrates. The substrates 340 and 640 comprise one more of V-shaped grooves 350 and 650, respectively, accommodated in the optical fibers 200 and 210, and comprise alignment marks 310 and 610 which are detected at the upper part. Besides, adhesion stop grooves 360 and 660 are formed at both sides of the V-shaped grooves 350 and 650 for preventing the overflow of an adhesion. The reference numerals 320 and 620 are optical glasses, and they adhere on the substrates 340 and 640 by using adhesives and the like. The optical fibers 200 and 210 have a slope of 8 degrees, respectively.

Figure 5:
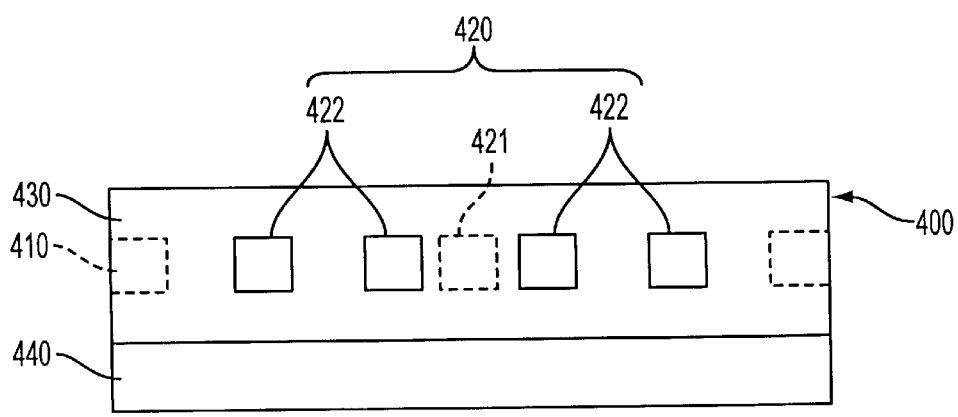
FIG. 5 is a vertical cutaway view of the Planar Lightwave Circuit with alignment marks according to the present invention.

FIG. 5 is a vertical cutaway view of the Planar Lightwave Circuit with alignment marks according to the present invention.

The reference numeral 440 is a substrate, and the reference numeral 430 is a clad and the reference numeral 420 is a core. The clad 430 is formed on the substrate 440, and has alignment marks 410 which are capable of detection at the upper side. Besides, the side of the alignment marks 410 is capable of detection at the side of the clad 430. The core 420 prepares one or more input parts 421 and a plurality of output parts 422 at both of their ends for forming waveguides to branch the optical input signals into plural paths in their interiors, and is formed in the clad 430 to direct the optical signals. The Planar Lightwave Circuit 400 also has a slope of about 8 degrees, and is positioned to contact in correspondence to the above-described optical fibers 200 and 210.

Figure 6:
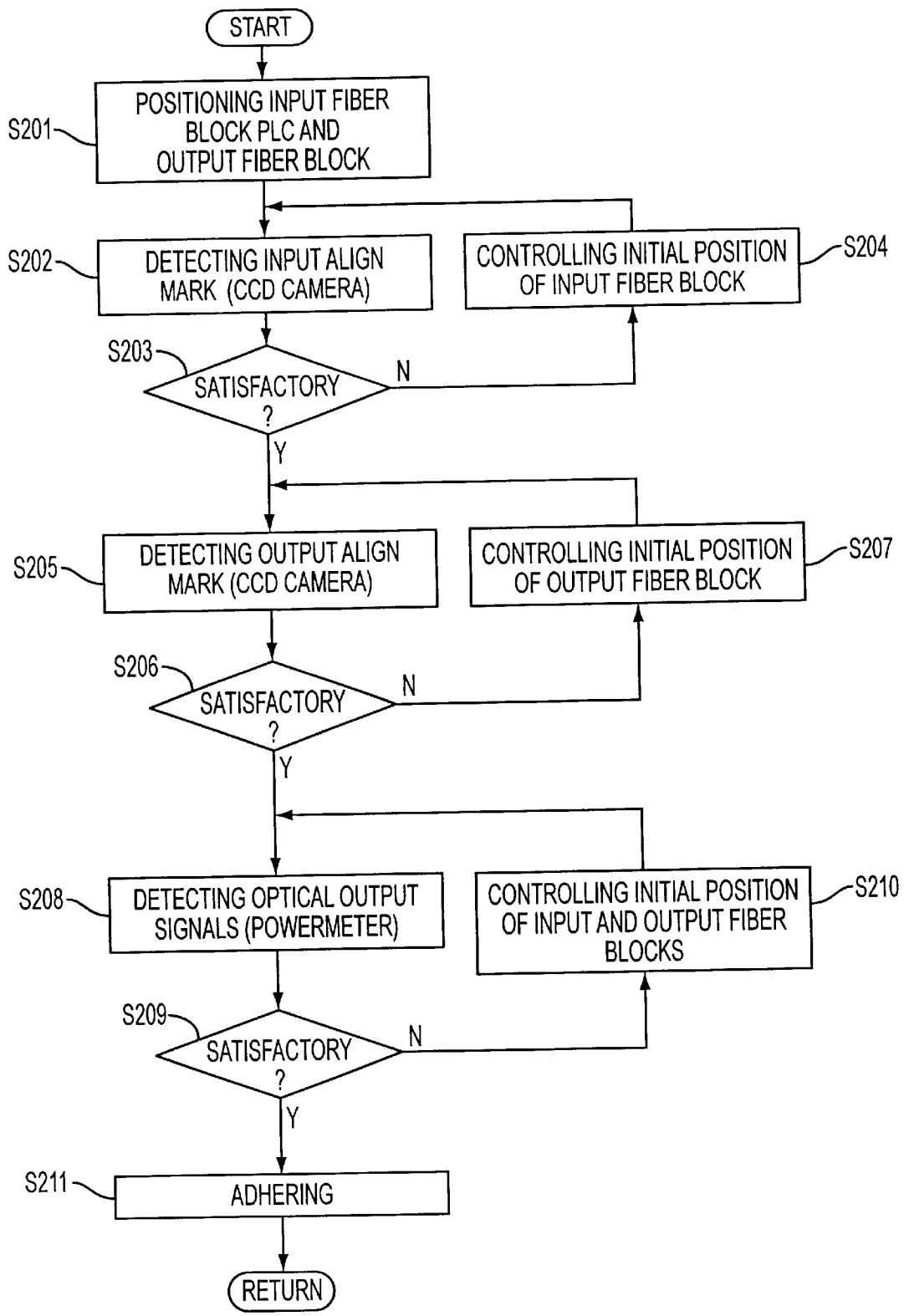
FIG. 6 is a flowchart of the method for controlling an apparatus for positioning optical fiber blocks and a Planar Lightwave Circuit according to the present invention.

FIG. 6 is a flowchart of a method for controlling an apparatus for positioning optical fiber blocks and the Planar Lightwave Circuit according to the present invention. Their operation will be explained in detail with reference to the apparatus structure of an embodiment of the present invention as shown in FIG. 3.

One part of the optical fiber 200 accommodated in the input optical fiber block 300 is connected to the laser source 100, and the input optical fiber block 300 is fixed to the input micro-positioner 800. One part of the optical fiber 210 which is accommodated in the output optical fiber block 600 is connected to the powermeter 700, and the output optical fiber block 600 is fixed to the output micro-positioner 810. But, the Planar Lightwave Circuit 400 is fixed to the upholder 820.

In such an arrangement, an operator drives the input and the output micro-positioners 800 and 810 by using the microcomputer 900, and then positions roughly the input and the output optical fiber blocks 300 and 600 and the Planar Lightwave Circuit 400 in a straight line (S201). Next, the microcomputer 900 detects each alignment mark 310 and 410 of the input part by means of using the upper and the side cameras 510 and 520 of the position detector 500 (S202), and decides whether the positions of the alignment marks are good (S203). If the positions of the alignment marks are not good, the operator controls an initial position of the input optical fiber block 300 (S204).

To explain the above-steps S202–S204, a detailed explanation follows.

The upper camera 510 detects each position image of alignment marks 310 and 410 in the Planar Lightwave Circuit 400 and the input optical fiber block 300 at the upper part. The side camera 520 detects each position image of alignment marks 310 and 410 disclosed at the side part of the substrate 340 of the input optical fiber block 300 and at the side part of the Planar Lightwave Circuit 400. All detected images are transmitted to the microcomputer 900. This microcomputer 900 decides whether each of the alignment marks 310 and 410 detected by the position detector 500 is positioned adequately, and controls an operation status of the input micro-positioner 800. Also, the operator is able to compare the images according to a display of the images by the monitor 910 in the microcomputer 900, and is able to control directly the operation status of the input micro-positioner 800.

Next, the microcomputer 900 detects each alignment mark 410 and 610 of the output part by using the upper and the side cameras 510 and 520 of the position detector 500 (S205), and decides whether the positions of the alignment marks are good (S206). If the positions of the alignment marks are not good, the operator controls the initial position of the output optical fiber block 600 (S207).

The basic operations of the S205–S207 steps are the same as the above-described S202–S204 steps, but they are operated after each transmitting part 511 and 521 moves the upper camera 510 and the side camera 520, respectively, into the positions which are capable of detecting each position image 410 and 610 of the Planar Lightwave Circuit 400 and the output optical fiber block 600. Accordingly, in these steps, the operator can position quickly and correctly the initial position which is capable of acquiring the determined optical output signals passing by the noise areas according to each alignment mark 410 and 610 when they correspond with each other.

Next, the operator detects the optical signals outputted from the output optical fiber block 600 (S208), and decides whether the optical signals are good that is, above the determined reference levels (S209). If the optical signals are not good, the operator controls again exactly the positions of the input and the output optical fiber blocks 300 and 600 (S210).

To explain the above-described S208–S210 steps, the following details are given.

In the status where the input optical fiber block 300, the Planar Lightwave Circuit 400 and the output optical fiber block 600 are positioned to acquire the initial output according to operating by means of each alignment mark 310, 410, and 610, as the above-described, the laser source 100 generates light signals for an incident optical signal. The incident signals which enter the inside of the optical fiber 200 are directed to the input optical fiber block 300, and are introduced into the input part 421 of the core 420 in the Planar Lightwave Circuit 400. The incident signals are branched into plural paths through the core 420, and are introduced into the plural optical fiber 210 of the output optical fiber block 600 through the plural output parts 422 in the Planar Lightwave Circuit 400. The incident signals are transmitted into the powermeter 700 by being directed through the inside of the optical fibers 210. The powermeter 700 calculates each intensity of the output optical signals introduced from the plural optical fiber 210, and applies the microcomputer 900. The microcomputer 900 compares the output optical signals of the output optical fiber block 600 with the determined reference levels inputted in advance, and then detects the final status of the input optical fiber block 300, the Planar Lightwave Circuit 400 and the output optical fiber block 600.

If the optical signals detected by the powermeter 700 are not good, i.e., if the optical signals are under the predetermined reference levels, the positions between the input and the output optical fiber blocks 300 and 600 are controlled in repetition until good optical signals are detected. Here, the input and the output micro-positioners 800 and 810 drive the input and the output optical fiber blocks 300 and 600 to each 6-axis direction so as to position locations and angles of the corresponding side to the Planar Lightwave Circuit 400.

Next, if the optical signals detected by the powermeter 700 are good, the input optical fiber block 300, the Planar Lightwave Circuit 400 and the output optical fiber block 600 are connected to each other by using adhesives. Accordingly, all positioning operations are finished (S211).

Therefore, in the apparatus and it controlling method for positioning optical fiber blocks and a Planar Lightwave Circuit according to the present invention, this invention detects each alignment mark which is formed in the input and the output optical fiber blocks and the Planar Lightwave Circuit, and is capable of positioning quickly and correctly the initial positions of the input and the output fiber blocks— that is, positions for acquiring the determined optical output signal passing by the noise areas; and accordingly, the overall productivity is increased.

Besides, with the present invention, there are not a lot differences, particularly in speed, between skilled hands and novices since these positioning operations do not rely on the expertise of the operator. Furthermore, the positioning operations for mass production can be accomplished since this invention can increase their quickness and repetition by controlling effectively the apparatus for positioning the optical fiber blocks and the Planar Lightwave Circuit with alignment marks, respectively.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. An apparatus for positioning optical fiber blocks and a Planar Lightwave Circuit in an optical fiber communication system, comprising:

means for positioning said optical fiber blocks and said Planar Lightwave Circuit using micro-positioning means, said micro-positioning means for fixing an input optical fiber block and an output optical fiber block of said optical fiber blocks, with alignment marks, respectively, and for positioning said optical fiber blocks and said Planar Lightwave Circuit with alignment marks by controlling the positions of the input optical fiber block and the output optical block;

means for detecting each position of said alignment marks of said input optical fiber block, said Planar Lightwave Circuit and said output optical fiber block; and means for controlling the operating status of said micro-positioning means, by judging each status of said alignment marks detected by said position detection means, and then controlling each operating status of said micropositioning means;

wherein at least one of said input and output optical fiber blocks comprises:

a substrate formed with plural grooves on an upper part thereof;

at least one optical fiber respectively fixed in a corresponding one of said grooves; and an optical glass for covering said upper part of said substrate and upper sides of said at least one optical fiber;

wherein said plural grooves are V-shaped, and said substrate further comprises adhesion stop grooves formed at both sides of said plural grooves, said adhesion stop grooves being V-shaped.

2. The apparatus as claimed in claim 1 wherein the apparatus further comprises means for adhering, so as to contact said input optical fiber block, said Planar Lightwave Circuit and said output optical fiber block, respectively.

3. The apparatus as claimed in claim 1, wherein said position detecting means comprises:

an upper camera for detecting the image of each alignment mark of said input optical fiber block, said Planar Lightwave Circuit and said output optical fiber block from the upper direction; and a side camera for detecting an image of each alignment mark of said input optical fiber block, said Planar Lightwave Circuit and said output optical fiber block from the side direction.

4. The apparatus as claimed in claim 3, wherein one of said upper camera and side camera is a charge coupled device camera.

5. The apparatus as claimed in claim 1, wherein said Planar Lightwave Circuit has two sides, and both sides of said Planar Lightwave Circuit are formed to give a slope.

6. The apparatus as claimed in claim 1, wherein each of said optical fiber blocks has at least one side, and said one side of each of said optical fiber blocks is formed to give a slope.

7. The apparatus as claimed in claim 1, wherein said alignment marks are formed by fabrication.

8. The apparatus as claimed in claim 7, wherein said alignment marks comprise F-shaped marks.

9. The apparatus as claimed in claim 1, wherein said Planar Lightwave Circuit comprises:

a core for branching at least one input into plural outputs, and for forming each waveguide;

a clad for molding said core; and the plurality of alignment marks formed in upper corners of said clad, to become a basis for the positioning of said Planar Lightwave Circuit.

10. The apparatus as claimed in claim 9, wherein said alignment marks are formed by fabrication.

11. The apparatus as claimed in claim 10, wherein said alignment marks comprise F-shaped marks.

12. The apparatus as claimed in claim 1, wherein each of said input and output optical fiber blocks comprises:

said substrate, having an upper part and side parts, said side parts having upper sides;

a plurality of optical fibers, each of which respectively fixed in a corresponding one of said grooves, wherein upper sides of said optical fibers are disclosed, said optical fibers direct optical signals;

the plurality of alignment marks formed on said upper part of said substrate, and said alignment marks form a basis for positioning of said optical fibers; and an optical glass for covering said upper sides of said substrate and said upper sides of said optical fibers.

13. The apparatus as claimed in claim 12, wherein said alignment marks are formed by fabrication.

14. The apparatus as claimed in claim 12, wherein said alignment marks comprise F-shaped marks.

15. An apparatus for positioning optical fiber blocks and a Planar Lightwave Circuit of an optical fiber communication system, comprising:

an input optical fiber block;

an output optical fiber block;

a laser source for introducing optical signals into said input optical fiber block;

a plurality of micro-positioners for fixing said input optical fiber block and said output optical fiber block with alignment marks, respectively, and for positioning said optical fiber blocks and said Planar Lightwave Circuit with alignment marks by controlling the positions of said input optical fiber block and said output optical fiber block;

a plurality of position detectors for detecting each position of said alignment marks of said input optical fiber block, said Planar Lightwave Circuit and said output optical fiber block, respectively;

a power meter for detecting optical output signals of said output optical fiber block;

a controller for judging each status of said alignment marks detected by said position detectors, and then for controlling each operating status of said micro-positioners; and an adhering part for contacting said input optical fiber block, said Planar Lightwave Circuit and said output optical fiber block, respectively;

wherein at least one of said input and output optical fiber blocks comprises:
  a substrate formed with plural grooves on an upper part thereof;
  at least one optical fiber respectively fixed in a corresponding one of said grooves; and
  an optical glass for covering said upper part of said substrate and upper sides of said at least one optical fiber;
  wherein said plural grooves are V-shaped, and said substrate further comprises adhesion stop grooves formed at both sides of said plural grooves, said adhesion stop grooves being V-shaped.

16. The apparatus as claimed in claim 15, wherein said position detectors comprises:

an upper camera for detecting the image of each alignment mark of said input optical fiber block, said Planar Lightwave Circuit and said output optical fiber block from the upper direction; and a side camera for detecting an image of each alignment mark of said input optical fiber block, said Planar Lightwave Circuit and said output optical fiber block from the side direction.

17. An apparatus for positioning optical fiber blocks and a Planar Lightwave Circuit in an optical fiber communication system, comprising:

means for positioning said optical fiber blocks and said Planar Lightwave Circuit using micro-positioning means, said micro-positioning means for fixing an input optical fiber block and an output optical fiber block of said optical fiber blocks, with alignment marks, respectively, and for positioning said optical fiber blocks and said Planar Lightwave Circuit with alignment marks by controlling the positions of said input optical fiber block and said output optical fiber block;

means for detecting each position of said alignment marks of said input optical fiber block, said Planar Lightwave Circuit and said output optical fiber block; and means for controlling the operating status of said micro-positioning means, by judging each status of said alignment marks detected by said position detection means, and then controlling each operating status of said micro positioning means, wherein each of said input and output optical fiber blocks comprises:
  a substrate, having an upper part and side parts, said side parts having upper sides, said substrate being formed with plural grooves on said upper part;
  a plurality of optical fibers, each of which respectively fixed in a corresponding one of said grooves, wherein upper sides of said optical fibers are disclosed, said optical fibers direct optical signals;
  the plurality of alignment marks formed on said upper part of said substrate, and said alignment marks form a basis for positioning of said optical fibers; and
  an optical glass for covering said upper sides of said substrate and said upper sides of said optical fibers;
  wherein said plural grooves are V-shaped, and said substrate further comprises adhesion stop grooves formed at both sides of said plural grooves, said adhesion stop grooves being V-shaped.

* * * * *